(12) United States Patent
Parkvall et al.

(10) Patent No.: US 8,982,806 B2
(45) Date of Patent: Mar. 17, 2015

(54) METHODS AND NODES IN A RADIO COMMUNICATION SYSTEM WITH EFFICIENT CONTROL CHANNEL USE

(75) Inventors: Stefan Parkvall, Stockholm (SE); Christian Hoymann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 277 days.

(21) Appl. No.: 13/099,925

(22) Filed: May 3, 2011

(65) Prior Publication Data
US 2011/0269474 A1     Nov. 3, 2011

Related U.S. Application Data

(60) Provisional application No. 61/330,580, filed on May 3, 2010.

(51) Int. Cl.
*H04W 72/12* (2009.01)
*H04L 5/00* (2006.01)
*H04B 7/155* (2006.01)

(52) U.S. Cl.
CPC ......... *H04W 72/1263* (2013.01); *H04L 5/0053* (2013.01); *H04L 5/0044* (2013.01); *H04B 7/155* (2013.01)
USPC .......................................... 370/329; 370/437

(58) Field of Classification Search
CPC ..................................... H04W 72/1263–72/14
USPC ........................... 370/328–338, 461–463, 474
See application file for complete search history.

(56) References Cited

U.S. PATENT DOCUMENTS

| | | |
|---|---|---|
| 2010/0232546 A1* | 9/2010 | Yu et al. .......................... 375/300 |
| 2011/0051654 A1* | 3/2011 | Blankenship et al. ........ 370/315 |
| 2011/0194412 A1 | 8/2011 | Park |
| 2012/0287848 A1 | 11/2012 | Kim |
| 2013/0010682 A1 | 1/2013 | Kim |

OTHER PUBLICATIONS

CATT. Multiplexing of R-PDCCH and R-PDSCH. 3GPP Draft; R1-101776; 3rd Generation Partnership Project (3GPP). Apr. 6, 2012.

(Continued)

*Primary Examiner* — Pao Sinkantarakorn

(57) ABSTRACT

The present invention generally relates to radio communication systems, relay nodes, controller nodes, user equipment (user terminals), software and methods for said systems and nodes. In one embodiment, a method for operating a control node for a wireless communication system is provided. The method comprises the steps: creating a data frame comprising an early part and a later part, wherein the early part comprises first control data for controlling a receiving node; checking whether second control data are to be put into the later part; scheduling payload data for the receiving node into the later part if second control data are not to be put into the later part; and transmitting the date frame to the receiving node.

11 Claims, 11 Drawing Sheets

(56) References Cited

OTHER PUBLICATIONS

Qualcomm Incorporated: "R-PDCCH Design," 3GPP Draft; R1-101496 R-PDCCH Design, 3rd Generation Partnership Project (3GPP), Mobile Competence Centre; 650, Route des Lucioles; F-06921 Sophia-Antipolis Cedex; France; vol. RAN WG1, No. San Francisco, US, 20100222, Feb. 16, 2010.

HTC Corporation: "Design Issues and Link-Level Performance of R-PDCCH for Type I Relay," 3GPP Draft; R1-100713, 3rd Generation Partnership Project (3GPP), Mobile Competence Centre; 650, Route des Lucioles; F-06921 Sophia-Antipolis Cedex; France; vol. RAN WG1, No. Valencia, Spain; 20100118, Jan. 15, 2010.

* cited by examiner

METHODS AND NODES IN A RADIO COMMUNICATION SYSTEM WITH EFFICIENT CONTROL CHANNEL USE

This application claims the benefit of U.S. provisional patent application No. 61/330,580 filed on May 3, 2010, the disclosure of which is fully incorporated herein by reference.

TECHNICAL FIELD

The present invention generally relates to radio communication systems, relay nodes, controller nodes, user equipment (user terminals), software and methods for said systems and nodes and, more particularly, to mechanisms and techniques for handling communications in radio communication systems which include relays. In particular, a design of a Relay-Physical Downlink Shared Channel (R-PQSCH) is presented.

BACKGROUND

The background is described with respect to LTE (Long Term Evolution). The skilled person will however realize that the principles of the invention may be applied in other radio communication systems, particularly in communication systems that rely on scheduled data transmissions.

The downlink transmission of the LTE (Long Term Evolution), or E-UTRAN radio access, is based on Orthogonal Frequency Division Multiplex (OFDM). The basic LTE downlink physical resource can thus be seen as a time-frequency grid as illustrated in FIG. 1, where each resource element (RE) corresponds to one OFDM subcarrier during one OFDM symbol interval. The dark shadowed resource elements form a resource block.

In the time domain, transmissions in LTE are structured into frames and subframes. Each frame of length $T_f=10$ ms consists of ten equally-sized subframes of length $T_{subframe}=1$ ms. Each subframe, in turn, consists of two equally-sized slots of length $T_{slot}=0.5$ ms.

Resource blocks (RBs) are also defined in LTE, where each RB consists of 12 contiguous subcarriers during one slot. The subcarrier spacing is set to $\Delta f=15$ kHz. In addition, a reduced subcarrier spacing of 7.5 kHz is defined targeting multicast broadcast transmissions in single-frequency networks.

Generally a resource element may be defined by certain ranges in any combination of the transmission resource, which are essentially time, frequency, code and space, depending on the actual transmission system under consideration.

The LTE time domain structure, in which one radio frame is divided into the 10 subframes #0 to #9 and each subframe is divided into a first and a second slot, wherein the first slot is an early part and the second slot is a later part of each subframe, is depicted in FIG. 2.

In LTE data transmissions to/from a user equipment (UE) are under strict control of the scheduler located in the eNB. Control signaling is sent from the scheduler to the UE to inform the UE about the scheduling decisions. This control signaling, consisting of one or several. PDCGHs (Physical Downlink Control Channels) as well as other control channels, is transmitted at the beginning of each subframe in LTE, using 1-3 OFDM symbols out of the 14 available in a subframe (for normal CP and bandwidths larger than 1.8 MHz, for other configurations the numbers may be different).

Downlink scheduling assignments, used to indicate to a UE that it should receive data from the eNB occur in the same subframe as the data itself. Uplink scheduling grants, used to inform the UE that it should transmit in the uplink occur a couple of subframes prior to the actual uplink transmission.

Generally, control data may comprise at least one of a downlink assignment and an uplink grant.

Among other information necessary for the data transmission, the scheduling assignments (and grants) contain information about the frequency-domain location of the resource blocks used for data transmission in the first slot. The frequency-domain location of the RBs in the second slot is derived from the location in the first slot, e.g. by using the same frequency location in both slots. Thus, scheduling assignments/grants operate on pairs of resource block in the time domain. An example hereof is shown in FIG. 3.

In FIG. 3, the slopingly hatched parts in each resource block 0 to 9 contains control data, whereas the horizontally hatched parts contain payload data. The subframe is divided into a first slot and a second slot. The control data is part of the first slot.

Relaying is considered for LTE-Advanced as a tool to improve e.g. the coverage of high data rates, group mobility, temporary network deployment, the cell-edge throughput and/or to provide coverage in new areas. The relay node (RN) is wirelessly connected to the radio-access network, for example via a donor cell controlled by a donor eNodeB (eNB). The RN transmits data to/from UEs controlled by the RN and may use the same air interface as an eNB, i.e. from a UE perspective there is rib difference between cells controlled by a RN and an eNB.

Due to the relay transmitter causing interference to its own receiver, simultaneous eNB-to-RN and RN-to-UE transmissions on the same frequency resource may not be feasible unless sufficient isolation of the outgoing and incoming signals is provided e.g. by means of specific, well separated and well isolated antenna structures. Similarly, at the relay it may not be possible to receive UE transmissions simultaneously with the relay transmitting to the eNB.

One possibility to handle the interference problem is to operate the relay such that the relay is not transmitting to terminals when it is supposed to receive data from a control node, e.g. the donor eNodeB, i.e. to create "gaps" in the relay-to-UE transmission. These "gaps" during which terminals (including 3GPP Rel-8 terminals) are not supposed to expect any relay transmission can be created by configuring MBSFN subframes as exemplified in FIG. 4. MBSFN subframes contain a small control signaling part at the beginning, followed by a silent period where the UEs do not expect any transmissions from the RN.

During the time period or frame or subframe, in which the UE does not expect data and/or in which the RN does not transmit data to the UEs, the RN can receive data, for example control data of the eNB.

RN-to-eNB transmissions can be facilitated through scheduling by not allowing any terminal-to-relay transmissions in some subframes.

One aim of the invention is to provide methods for efficiently transferring control data and payload data in a network scenario comprising a control node (donor eNB), a relay node and possibly several UEs. Therein the above interference problem associated with the use of relay nodes shall be solved.

The invention is particularly relevant for LTE based systems. Downlink control signaling is discussed in Section 16.2.4, pages 333 to 336, of the book entitled 3G Evolution: HSPA and LTE for Mobile Broadband, first edition 2007 by Dahlmann, Parkvall Skoeld and Beming. It is also pointed to the standards 3GPP LTE Rel-10 and to the technical reports 3GPP TR 36.814 and 36.912. Multiplexing a Relay Physical Downlink Control Channel (R-PDCC) in the downlink subframe from the donor eNB is discussed in U.S. 61/308,385. The cited references/documents are incorporated by reference herewith.

SUMMARY

The invention focuses mainly on the communication between a control node (e.g. a eNB) and a relay node (RN). The invention focuses also on the communication between a control node and a UE. FIG. 7 shows a radio communication system comprising a control node (eNB) with a scheduler, a relay node (RN) and a first (UE 1) and a second user equipment (UE 2). Each of the control node, the relay node and the first and second user equipment comprises a transmitter and a receiver. The control node, the relay node and the user equipment are connected via a wireless interface. The arrows indicate possible uplink and downlink communications. The invention focuses on the communication between the control node and the relay node. The invention can also be applied to a communication between a control node, and a UE. The direction from the control node to the relay node is considered as downlink, the direction from the relay node to the control node is considered as uplink.

The invention relates to a method for operating a control node for a wireless communication system comprising the steps: creating a data frame comprising an early part and a later part, wherein the early part comprises first control data for controlling a receiving node; checking whether second control data are to be put into the later part;

scheduling payload data for the receiving node into the later part if second control data are not to be put into the later part; and transmitting the data frame to the receiving node.

Advantageously the receiving node is a relay node. The receiving node may also be a UE.

The method may further comprise putting second control data into the later part. The first control data may comprise a downlink assignment, the second control data may comprise an uplink grant.

Advantageously, the first control data indicates the resource on which the first control data are transmitted if payload data are to be transmitted in the second part.

The payload data may be data for the receiving node only.

The control node can be an eNodeB and also a Pico-eNodeB.

The first control data may comprise an indication on resources on which payload data are transmitted. It is advantageous that the resource on which the first control data are transmitted is indicated, if payload data is transmitted in the later part. The resource may, for example, be a frequency band or a set of subcarriers.

The early part and the later part may be transmitted with different transmission methods. The later part may advantageously be transmitted with a higher throughput than the early part. The early part and the later part may also be transmitted with an identical transmission method. The first part and the second part may have a flexible border. The border may be put in the middle of the data frame. The data frame may also be regarded as a subframe.

The invention also relates to a control node for a wireless communication system comprising: a controller for creating a data frame comprising an early part and a later part, wherein the early part comprises first control data for controlling a relay node; a checking entity for checking whether second control data are to be put into the later part;

a scheduler for scheduling payload data for the relay node into the later part if second control data are not to be put into the later part; and a transmitter for transmitting the data frame to the relay node.

The control node may further comprise a putting entity for putting second control data into the later part.

The invention relates also to a method for operating a receiving node for a wireless communication system comprising the steps: receiving a data frame from a control node, wherein the data frame comprises an early part and a later part, wherein the early part comprises first control data for controlling the receiving node, detecting whether the later part contains second control data or payload data; and processing the later part in dependence of the detection.

Advantageously the receiving node is as relay node. The receiving node may also be a UE.

The first control data may indicate at least one resource on which payload data are received;

Advantageously, the first control data indicates the resource on which the first control data are transmitted if payload data are to be transmitted in the second part.

The method for operating a receiving node may further comprise the steps: Checking whether a resource on which the first control data are received is indicated by the first control data; Deciding whether the later part contains second control data or payload data based on the check.

The invention does also relate to, a receiving node for a wireless communication system comprising: a receiver for receiving a data frame from a control node, wherein the data frame comprises an early part and a later part, wherein the early part comprises first control data for controlling the receiving node; a detector for detecting whether the later part contains second control data or payload data; and a processor for processing the later part in dependence of the detection.

The receiving node may further comprise: a checking entity for checking whether a resource on which the first control data are received is indicated by the first control data; a decision entity for deciding whether the later part contains second control data or payload data based on the check.

Advantageously the receiving node is as relay node. The receiving node may also be a UE.

The invention is advantageously applied in LTE systems. In this respect it is pointed to the standards 3GPP LTE Rel-10 and to the technical reports 3GPP TR 36.814 and 36.912.

An important aspect of the invention is to allow scheduling of data in the resources unused for UL but only to the relay with DL assignment in the preceding slot. Furthermore, the invention does not require specification of additional DCI formats as the interpretation of the DL assignments at the RN takes the presence/absence of an R-PDCCH in the second region for the same RN into account.

Further embodiments of the invention are further defined in the dependent claims.

DETAILED DESCRIPTION

In many applications, it is desirable to time align (possibly within a small offset) the subframe structure in the cells controlled by the eNB and cells controlled by the RN. As a consequence of this, the RN cannot receive the normal control signaling from the RN at the beginning of a subframe as the RN need to transmit control signaling to the UE in that part of the subframe. Instead, L1/L2 control signaling from the eNB to the RN need to be located later into the subframe.

Therefore, LTE-Advanced will support a new control channel, the R-PDCCH (Relay-Physical Downlink Control Channel), which is transmitted later into the subframe. An R-PDCCH carries, similarly to a PDCCH, either an uplink grant or a downlink assignment. Multiple R-PDCCHs (and possibly other control channels defined for relay operation) can be transmitted and the time-frequency regions where these are transmitted are referred to as an "R-PDCCH region" herein. The R-PDCCH region will typically not occupy the full system bandwidth during a subframe and the remaining resources can be used for transmission of data to UE and/or RNs.

Multiplexing the R-PDCCH with other transmissions in the downlink subframe form the donor eNB can be done in different ways, e.g. pure FDM or FDM+TDM, each with their respective pros and cons.

These, options are discussed in U.S. 61/308,385, entitled R-PSCCH Multiplexing, which is herewith entirely incorporated into this application.

Consider the option chosen by 3GPP as well. In 3GPP, the current assumption is to divide subframes used for communication between RN end eNB into two parts (the boundary between the two parts could e.g. coincide with the slot boundary).

In the first part, located early in the subframe, R-PDCCHs containing time-critical information, typically related to downlink transmission in the same subframe, e.g. scheduling assignments, is transmitted. In the second part, located later in the subframe, R-PDCCHs containing less time-critical information, typically related to uplink activity in a later subframe, e.g. scheduling grants and, if defined, hybrid-ARQ acknowledgements, is transmitted.

Figure 1:
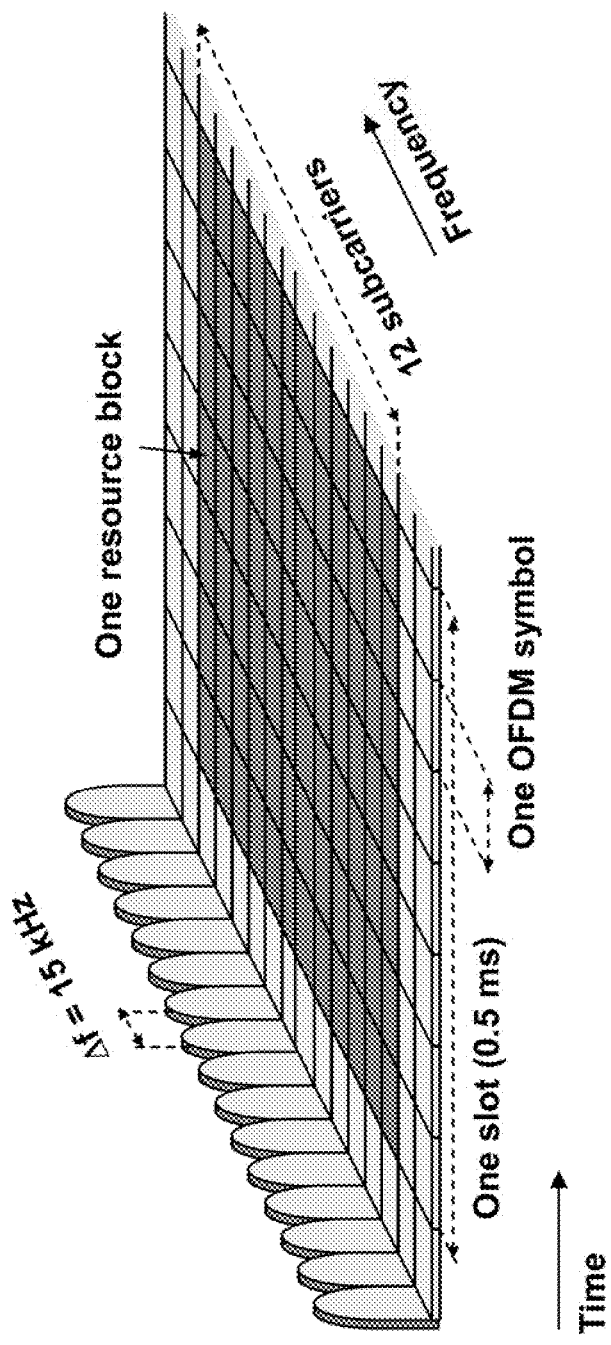
FIG. 1 shows a physical resource in a time frequency grid as used in LTE.
Figure 2:
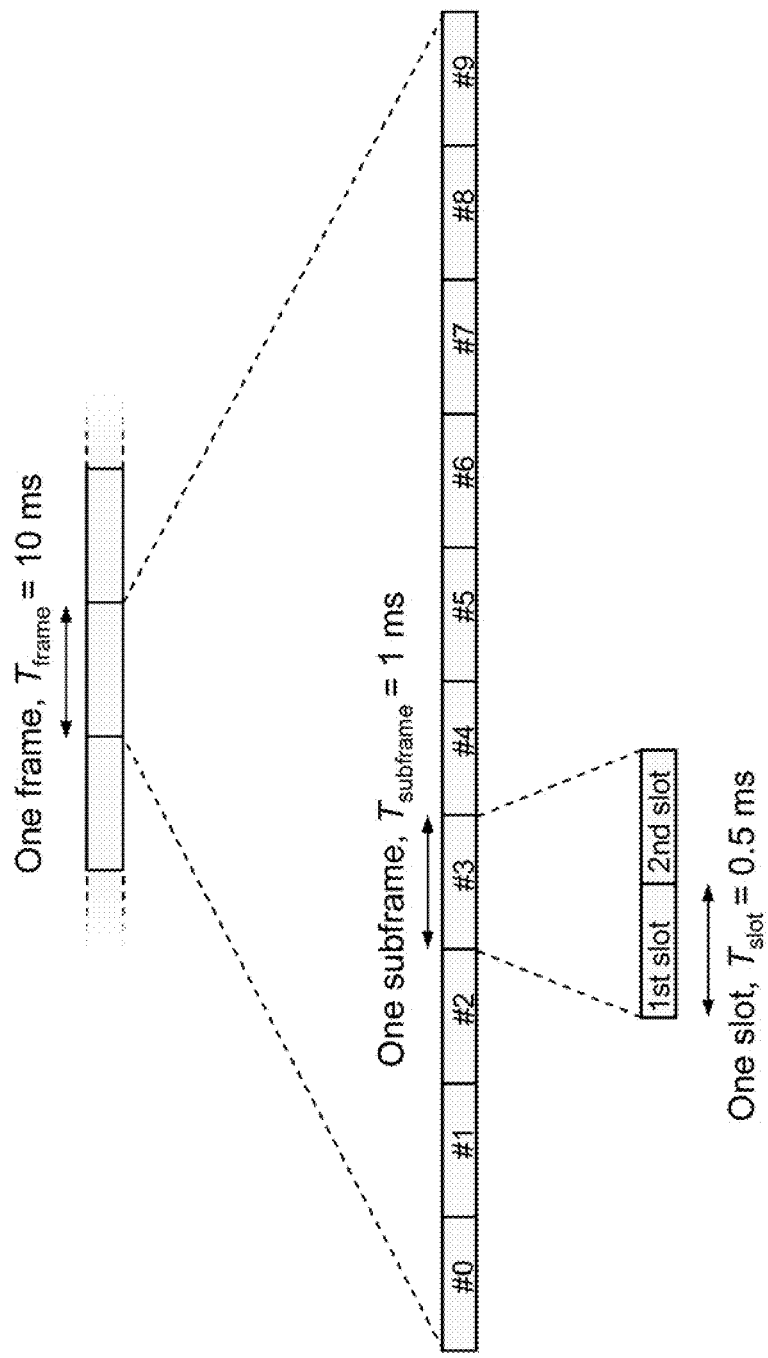
FIG. 2 shows a LTE time domain structure.
Figure 3:
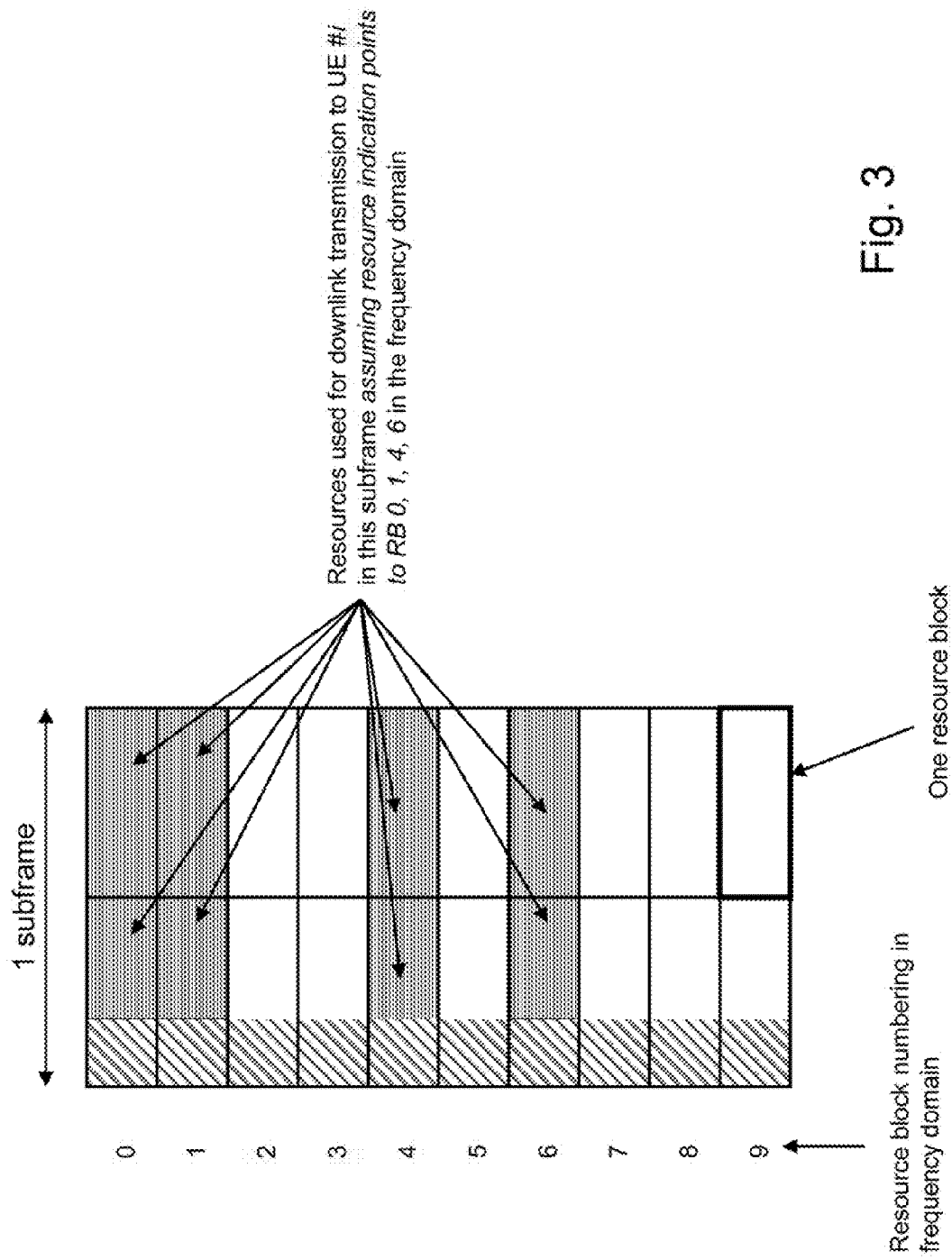
FIG. 3 shows an example of a scheduling decision indicating resource blocks upon which the UE should receive data.
Figure 4:
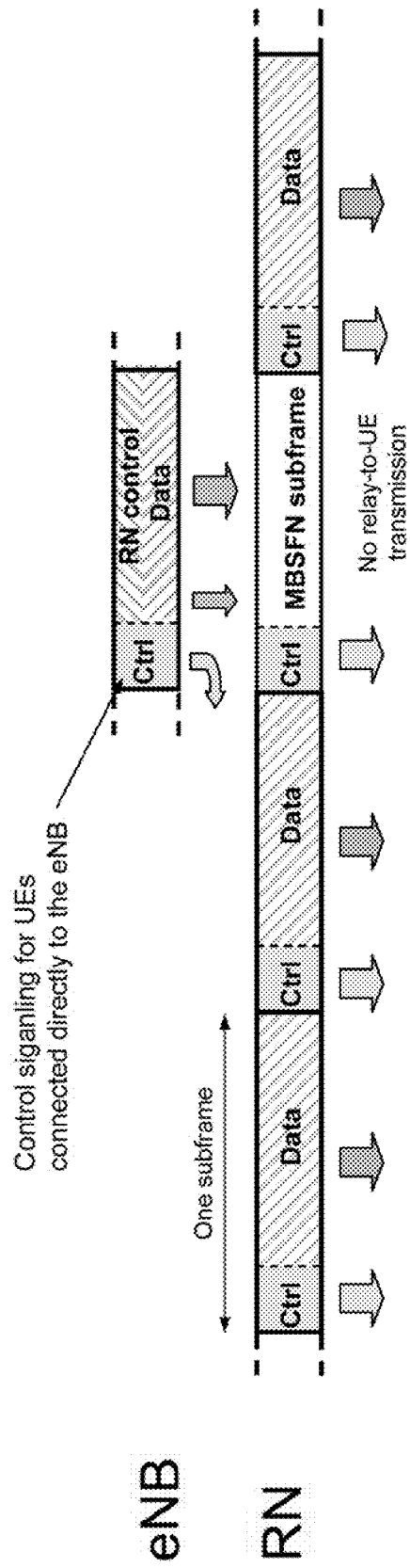
FIG. 4 shows an example of an eNB-to-RN transmission and a RN-to-UE transmission on the basis of a frame structure.
Figure 5:
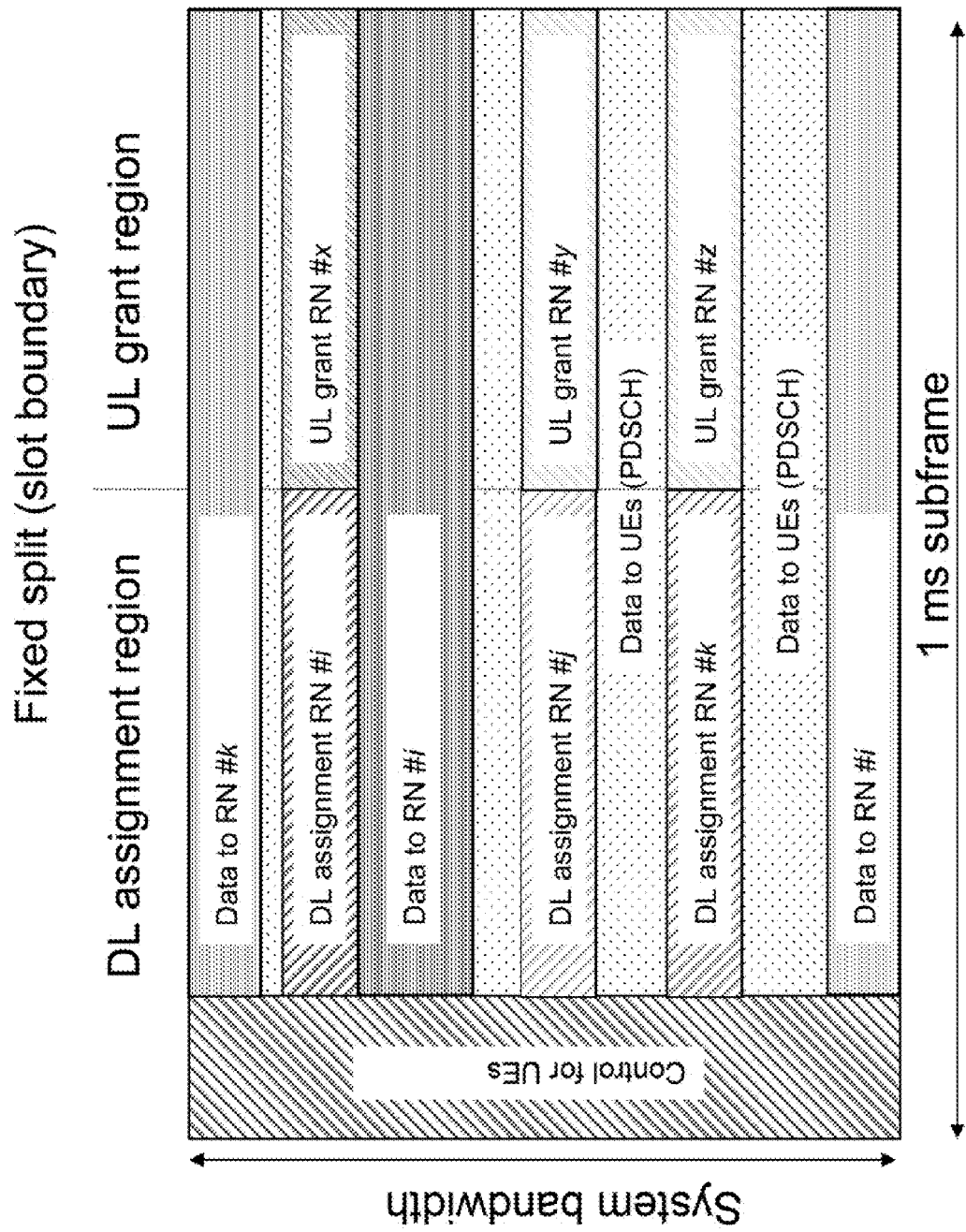
FIG. 5 shows R-PDCCH multiplexing according to 3GPP RAN-1.

This is illustrated in FIG. 5. The system bandwidth is vertically depicted, the time span of one subframe is horizontally depicted. The subframe is split at the slot boundary. A range in the vertical direction defines a certain frequency band of the system bandwidth. A range in the horizontal direction defines a certain time period in the subframe. Control data for UEs, Data to relay nodes #k and #i, DL assignments for relay node #i, #j, #k, Uplink grants for relay nodes #x, #y, #z and data to UEs are transmitted on a specified frequency range and during a specified time span in the subframe as depicted in FIG. 5. For example, the DL assignment RN #i and the UL grant RN #x are Relay-Physical Downlink Control Channels.

Although in the FIG. 5 each R-PDCCH is illustrated to cover only one part of the frequency band, it could equally well be distributed in the frequency domain, e.g. to provide additional diversity. Note that uplink related information may be transmitted in the first region as well if not all available resources in the region have been used for downlink related information. The benefits of this structure is that downlink assignments could be decoded early in the subframe, thereby reducing the overall latency, while the somewhat less time critical uplink grants are transmitted in the later part of the subframe.

The DL assignment and UL grant located in the same frequency region may (e.g. i=x in FIG. 5) or may not (i≠x) be related to the same RN. In case cell-specific reference signals are used for demodulation, both of the previous cases are possible, while if UE-specific reference signals (also known as demodulation-specific reference signals) the assignment/grant should be directed to the same RN (i.e. i=x).

Figure 6:
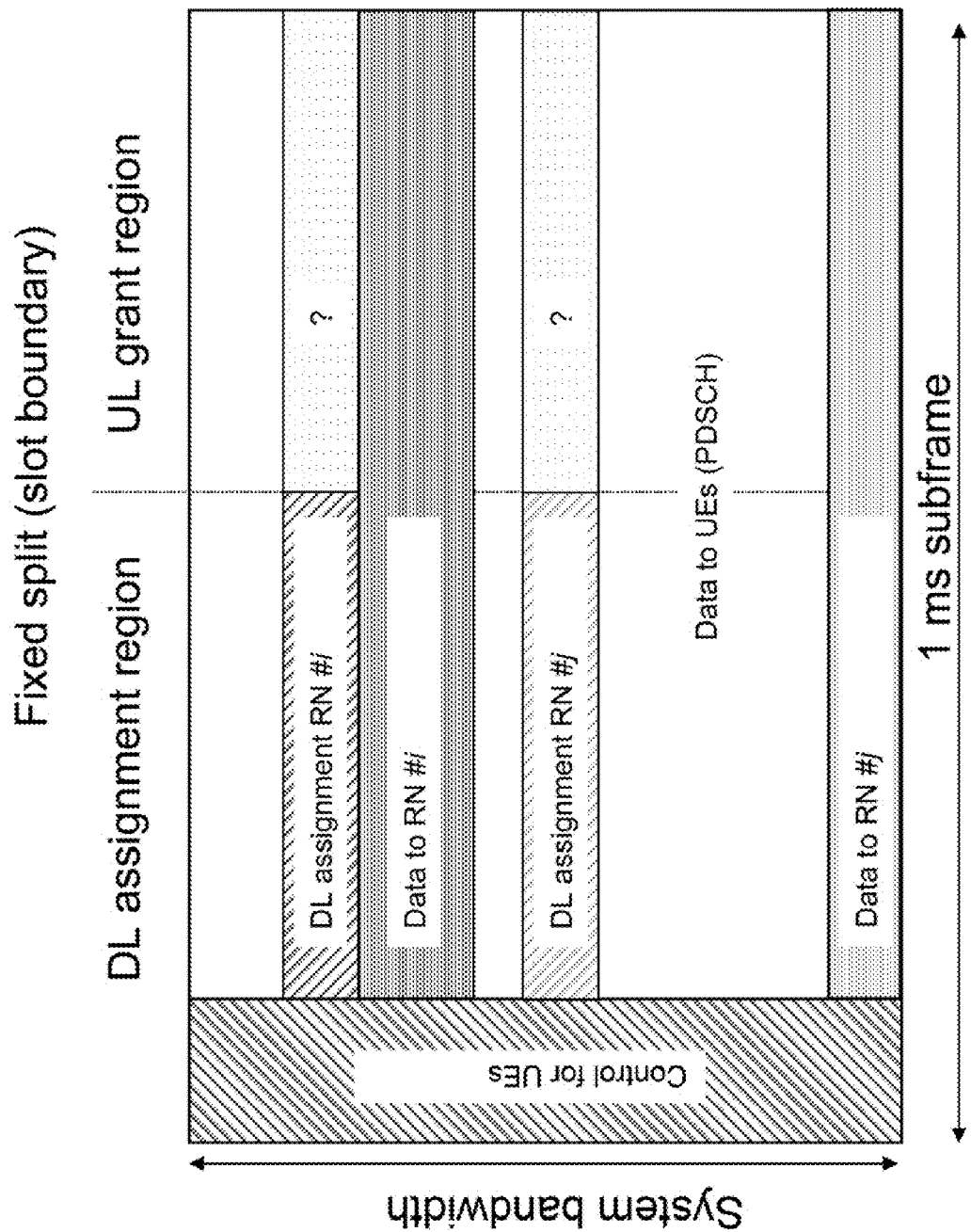
FIG. 6 shows a case having more DL assignments than UL grants.
Figure 7:
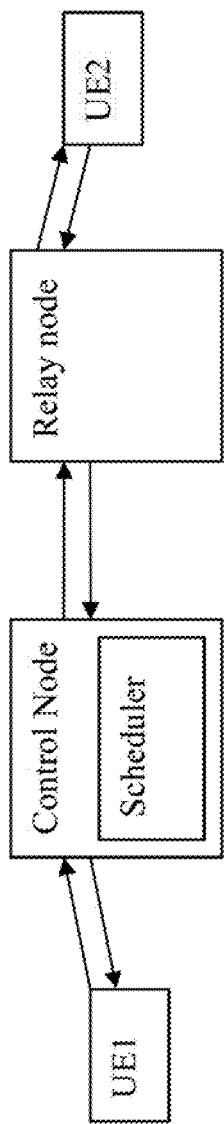
FIG. 7 shows a radio communication system.

When the number of uplink grants transmitted from the eNB is less than the number of downlink assignments the question how to use the latter part of the subframe in the resource blocks occupied by R-PDCCH arises. This situation is illustrated in FIG. 6. The latter parts of the R-PDCCHs which are not used for UL grants are marked by a "?".

One possibility is to leave these resources unused. As long as the each grant/assignment consumes only a small amount of resources and/or the number of UL grants is not significantly smaller than the number of DL assignments, the loss in efficiency from this approach is acceptable.

Another possibility is to use these resources for transmission of data to relay nodes. However, this requires the definition of a new data channel, the "R-PDSCH", with a different (smaller) span in time than the already existing PDSCH (the time span may also be different in different resource blocks, depending on the scheduling decision). Furthermore, additional control signaling formats is required in order to schedule data in the shortened "relay data region" (marked with "?" in FIG. 6) as the current control signaling formats in LTE are defined assuming data transmission over (more or less) the full subframe duration (i.e. both the slots). This leads to additional specification and implementation complexity.

Figure 8:
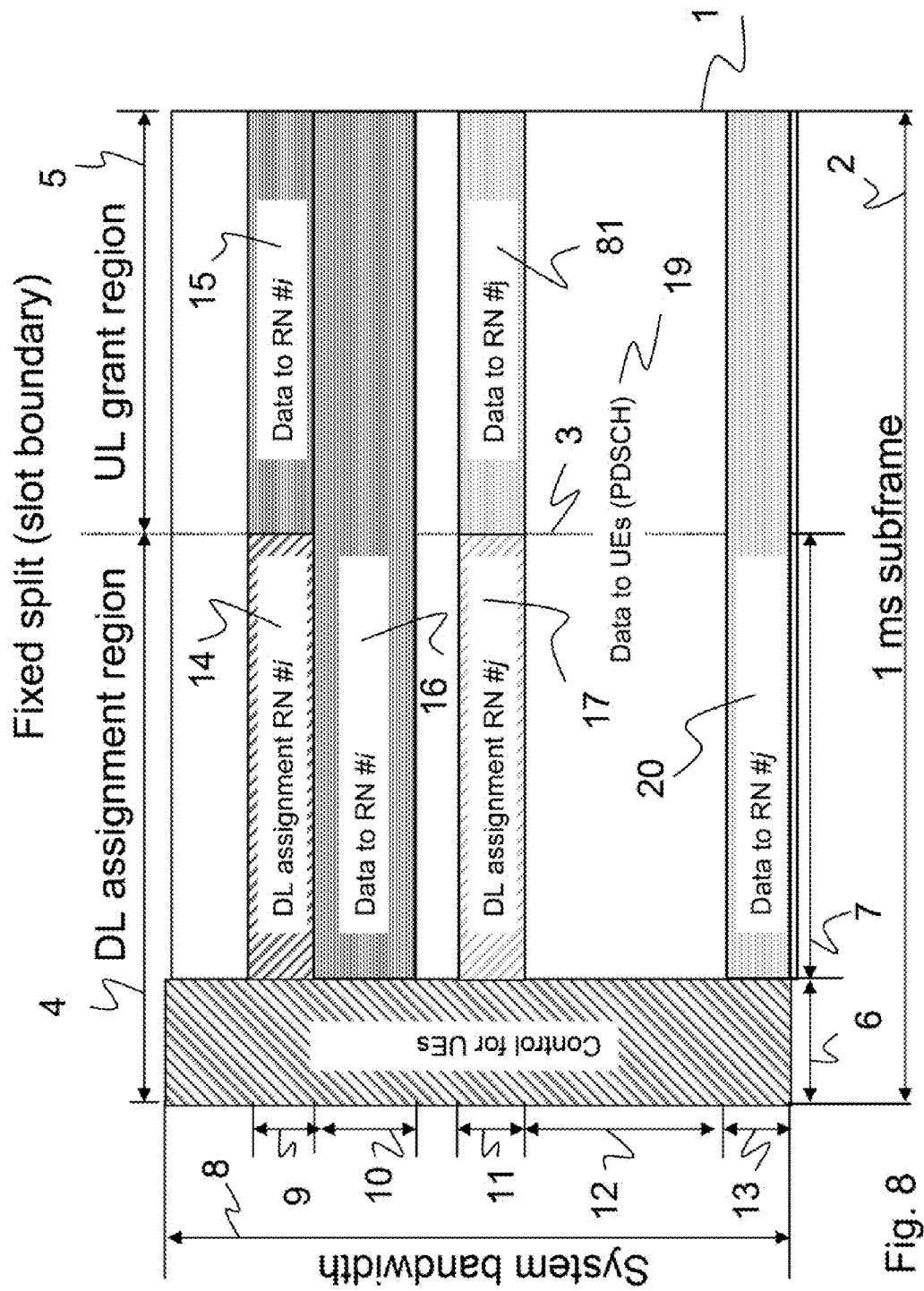
FIG. 8 shows a usage of second slot for an eNB-to-RN transmission.

The first part of the invention is to allow using the resource blocks following a DL assignment to RN #i for data to RN #i only (and not for data to other RNs or UEs) as illustrated in FIG. 8. [The resource blocks could also be used for control signaling to the same or other RNs, but not for data to other RNs.] In the following description it is assumed that the first region (the DL assignment region) is located in the first slot of a subframe and the second region (the UL grant region) is located in the second slot of a subframe for simplicity but the method can easily be generalized to other splits between the first and second region.

FIG. 8 shows a structure of a subframe 1 (to be transmitted by an eNB) according to a time frequency grid. A duration 2 of the subframe 1 amounts to 1 ms. The subframe 1 is divided in the time domain by a slot boundary 3 into a first slot 4 and a second slot 5. The first slot 4 comprises a UE-control part 6 used for controlling UEs and a part 7, which can be used to transmit downlink assignments to relay nodes. A system bandwidth 8 is divided into several subbands. In a first subband 9 during part 7 a DL assignment 14 for RN #i is transmitted and during slot 5 (in subband 9) payload data 15 for the same RN #i are transmitted. In a second subband 10 during part 7 and slot 5 payload data 16 to RN #i are transmitted. In a third subband 11 during part 7 a DL assignment 17 for RN #j is transmitted and during slot 2 (in subband 11) payload data 18 for the same RN #j are transmitted. In a fourth subband 11 during part 7 and slot 5, payload data 19 to UEs, e.g. a Physical Downlink Shared Channel, are transmitted. In a fifth subband 13 during part 7 and slot 5 payload data 20 to RN #j are transmitted.

It is important to note that the payload data 15 for RN #i, which is the same relay node for which the DL assignment 14 has been transmitted, is transmitted on the same first subband 9. In other words, slot 5 on subband 9 following the DL assignment 14 to RN #i is used for payload data to the same RN #i and not for payload data to any other relay node. Slot 5 on subband 9 may also be used for uplink grants to any RN. The same concept is also reflected on subband 11, where slot 5 is used for payload data 18 to the same RN #j, for which the DL assignment 17 has been transmitted during part 7 on the same subband.

The second part of the invention is to reuse the existing DCI formats but change the interpretation at the RN. The DCI formats for downlink assignments used in LTE Rel-8 and later releases specify the resources upon which the receiver (UE) should expect data from the eNB to be transmitted. The resource indication specifies in the frequency domain which resource blocks to receive and it is implicitly assumed that the full subframe (except the control region) is used for data transmission. Since a RN scheduled in the downlink knows upon which resources it has received the DL assignment, it is proposed to, at the RN, exclude the resources occupied by the decoded R-PDCCH when determining upon which resources the data from the eNB is to be received. This is exemplified in FIG. 9. Assume that the RN detects the downlink scheduling assignment on the R-PDCCH transmitted on resource block 4 in the first slot and that the scheduling assignment indicates data on resources 0, 1, 4 and 6, e.g. using one of the DCI formats already specified for LTE Rel-8. The RN should in this case receive the corresponding data transmission on resource blocks 0, 1 and 6 in the first slot and on 0, 1, 4 and 6 in the second slot, i.e. resource block 4 (where the R-PDCCH was detected) is excluded from data reception in the first slot. For simplicity reasons the example assumed that the R-PDCCH ends at the boundary between the two slots of a subframe but the method can straightforwardly be generalized to any split between the two "regions". Similarly, to illustrate the principle in the invention, any guard time (e.g. unused OFDM symbols at the beginning or the end of the eNB-RN transmissions) potentially required for the eNB-to-RN link is not part of the illustration but can easily be accounted for.

Obviously, the eNB should preferably hot transmit data to the RN on resources where the RN will not receive such data (resource block 4 in the first slot in the example above). This can be achieved by modifying the R-PDSCH-to-RE mapping in LTE such that the REs in the first part of the subframe used by control signaling to the scheduled RN are skipped. From a transmitter perspective, the only difference would be a smaller number of REs available to the PDSCH (due to some of them being used for control signaling to the RN) while coding and modulation would remain the same. Another possibility could be to separately encode the data for the RB in the second slot (i.e. bits in RBs with frequency index 0, 1, 6 in FIG. 9 are coded and modulated separately from bits in the RB with frequency index 4, possibly with different modulation and coding schemes).

Figure 9:
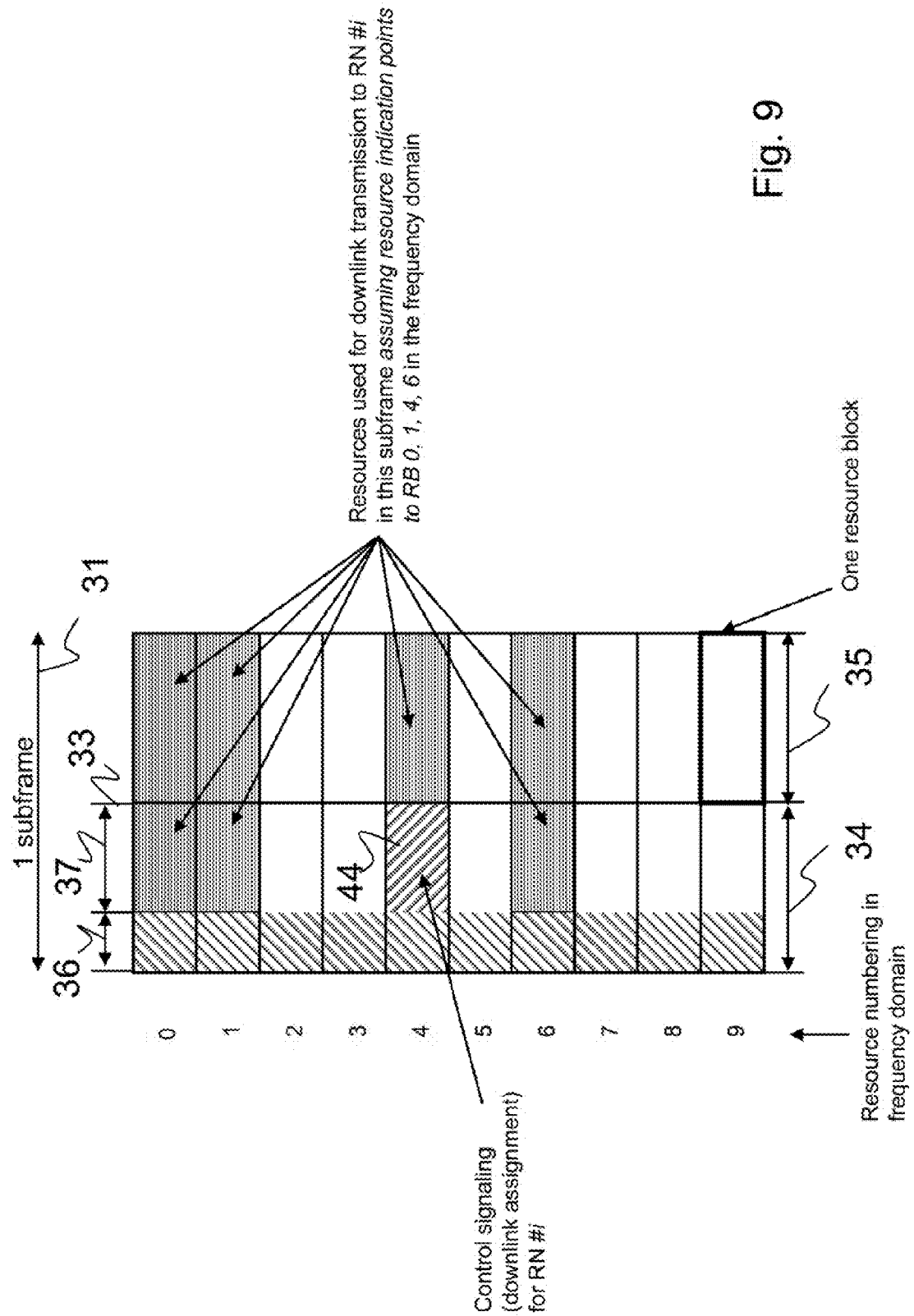
FIG. 9 shows an example of proposed resource indication.

FIG. 9 shows one subframe 31 comprising a first slot 34 and a second slot 35 separated by a slot boundary 33. In the frequency domain, resources are numbered from 0 to 9. Each number indicates a certain subband. The slot 34 comprises a UE-control part 36 and a part 37, which can be used to transmit downlink assignments to relay nodes. In part 37, on subband 4 a downlink assignment 44 for RN #i is transmitted. In this example, the downlink assignment 44 indicates resource blocks 0, 1, 4 and 6 for downlink transmissions to RN #i. The relay node RN #i learns from this indication, that in part 37 of slot 34 and in slot 34 on the subbands 0, 1, 6 downlink transmissions to RN #i can be received. Further, as the downlink assignment 44 has also indicated resource block 4 and as the downlink assignment 44 has been received in part 37 on subband 4, this situation will be interpreted that downlink transmissions to RN #i are also received in the slot 35 on subband 4. In this way, slot 35 on subband 4 can also be efficiently used for downlink transmissions to RN #i.

Figure 10:
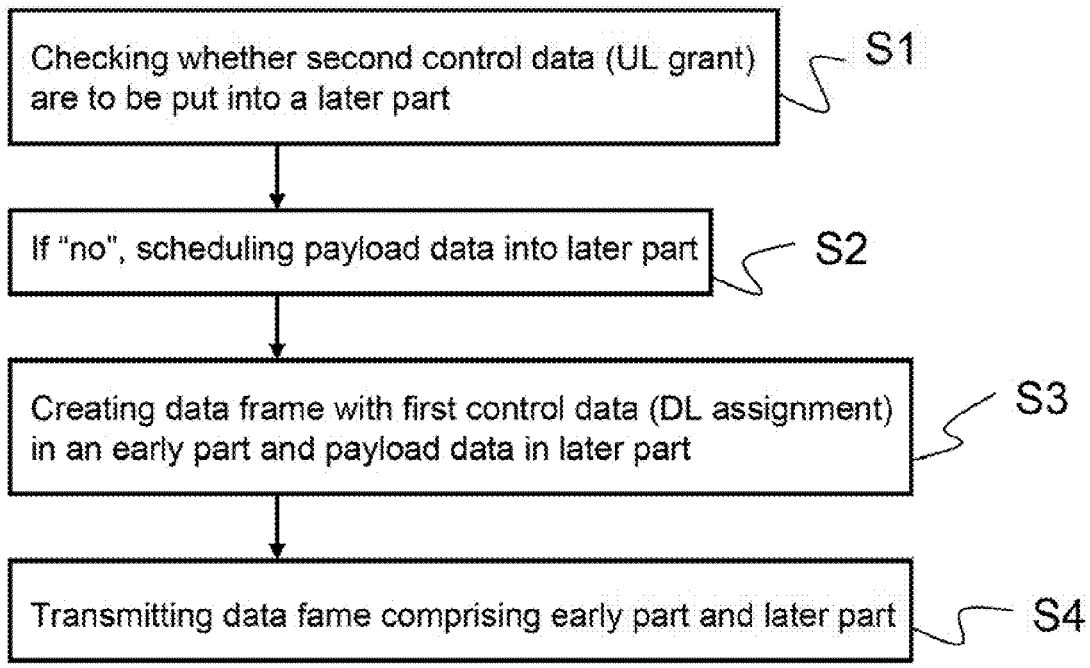
FIG. 10 shows a flowchart of a method for operating a control node according to one embodiment.

FIG. 10 shows a flowchart of a method for operating a control node according to one embodiment. The skilled person will note that the method steps may at least partly be performed in different orders. In step S1, the control node checks whether second control data (UL grant) are to be put into a later part. If second control data is not to be put into the later part, payload data is scheduled into the later part in step S2. A data frame is created having an early part and the later part, wherein the early part comprises first control data (DL assignment) and the later part comprises payload data (step S3). The created frame is transmitted.

With this, concept the later part can be used to transfer payload data in cases where second control data (UL grants) do not need to be transferred in the later part.

Figure 11:
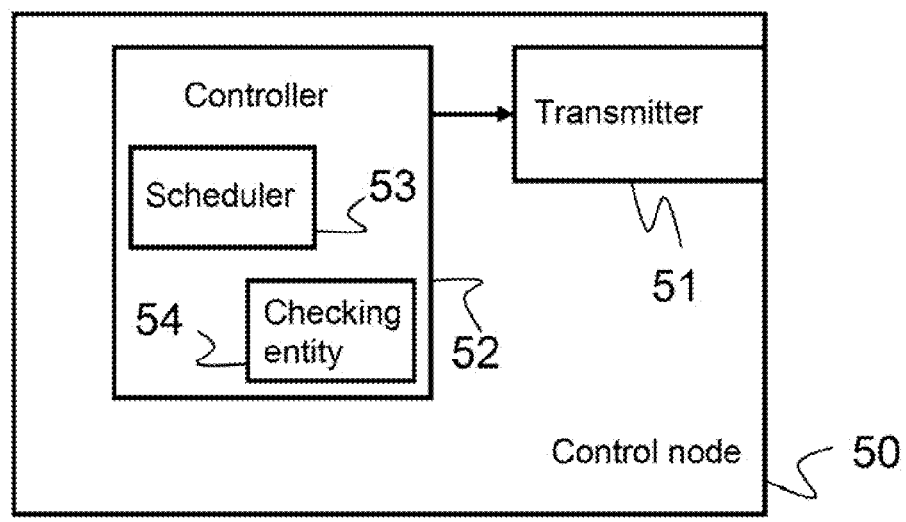
FIG. 11 shows a control node according to one embodiment.

FIG. 11 shows a control node 50 according to one embodiment. The control node 50 comprises a controller 52 for creating a data frame having an early part and a later part. From a scheduler 53 and a checking entity 54, the controller learns, whether payload data or second control data (UL grants) is to be put into the later part. The early part comprises first control data (DL assignments). The created data frame having an early part and a later part is to be transmitted via a transmitter 51.

Figure 12:
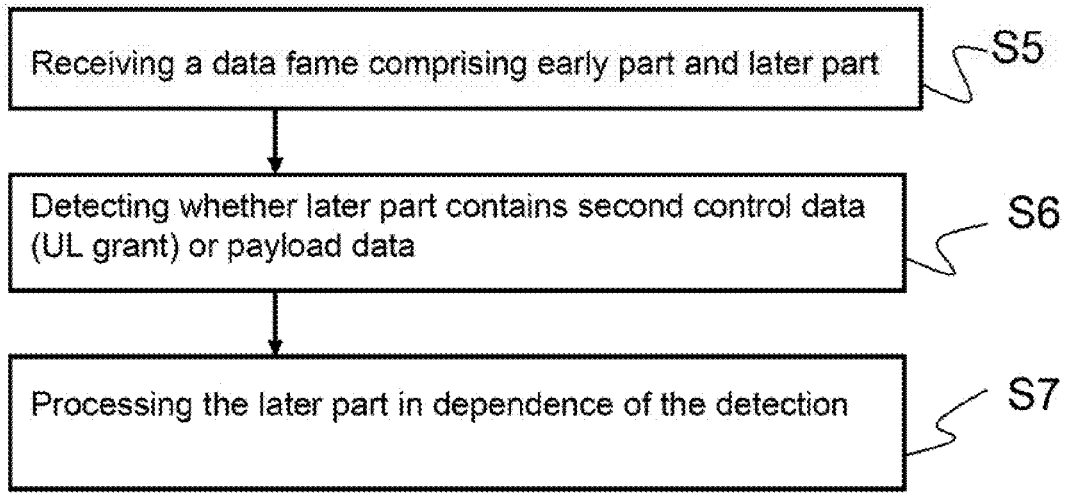
FIG. 12 shows a flowchart of a method for operating a receiving node according to one embodiment.

FIG. 12 shows a flowchart of a method for operating a receiving node according to one embodiment. In step S5, a data frame comprising an early part and a later part is received from a control node, e.g. control node 50. In step S6, it is detected whether the later part contains second control data (UL grant) or payload data. The further processing depends on the detection (step S7). The detection according to step S6 may be performed by the steps: checking whether a resource on which the first control data are received is indicated by the first control data by deciding based on the outcome of the check whether the later part contains second control data or payload data. An indication of the resource on which the first control data are received is e.g. the resource number 4 in FIG. 9. In this way a particular efficient method for detecting payload data in the second slot is obtained.

Figure 13:
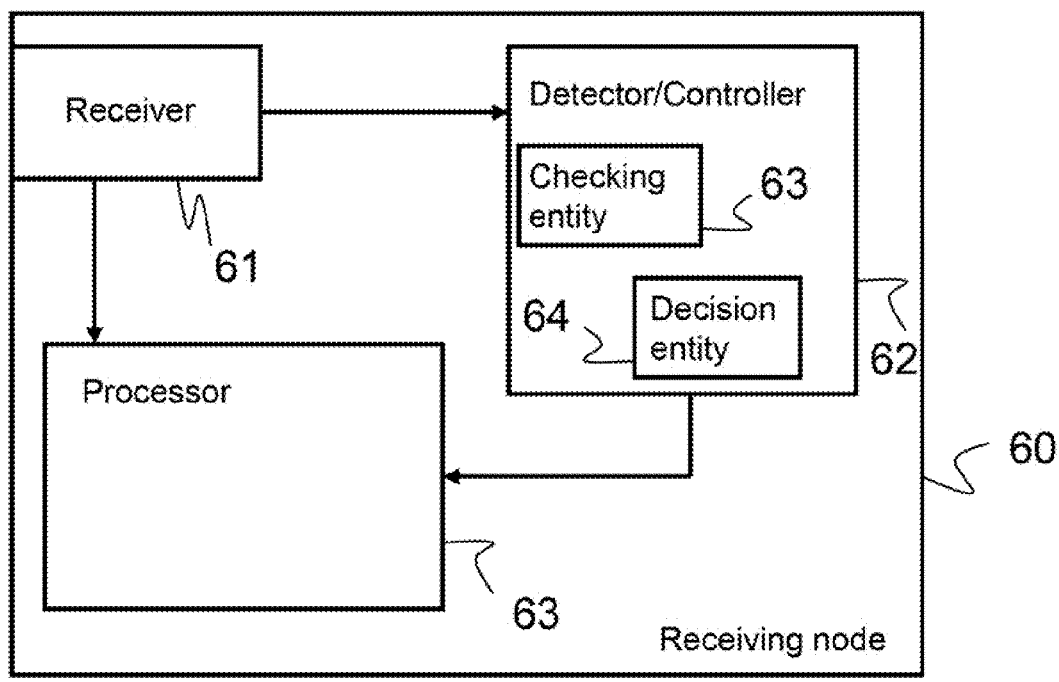
FIG. 13 shows a receiving node according to one embodiment.

FIG. 13 shows a receiving node 60 comprising a receiver 61 for receiving a data frame from a control node, e.g. from control node 50. The received data frame comprises an early part and a later part. The early part comprises first control data (DL assignments). The detector/controller 62 detects whether the second part contains second control data (UL grants) or payload data. For the detection the detector/controller 62 may use a checking entity 63 for checking whether a resource on which the first control data are received is indicated by the first control data and a decision entity 64 for deciding whether the later part contains second control data or payload data based on an output of the checking entity 63.

ABBREVIATIONS

ARQ Automatic Repeat Request
CP Cyclic Prefix

DCI Downlink Control Information
DL Downlink
eNB eNodeB
eNodeB LTE base station
E-UTRAN evolved UMTS Terrestrial Radio Access Network
FDM Frequency Division Multiplexing
3GPP Third Generation Partnership Project
L1 Layer 1
L2 Layer 2
LTE Long Term Evolution
MBSFN Multicast Broadcast Single Frequency Network;
OFDM Orthogonal Frequency Division Multiplexing
PDCCH Physical Downlink Control Channel
PDSCH Physical Downlink Shared Channel
RB Resource Block
RE Resource Element
Rel Release
R-PDCCH Relay-Physical Downlink Control Channel
R-PDSCH Relay-Physical Downlink Shared Channel
TDM Time Division Multiplexing
UE User Equipment
UL Uplink
UMTS Universal Mobile Telecommunication System

The invention claimed is:

1. A method for operating a control node for a wireless communication system comprising the steps:
creating a data frame comprising a plurality of resource blocks, at least one of the plurality of resource blocks comprising an early part and a later part, wherein the early part of one of the resource blocks comprises first control data for controlling a relay node;
checking whether second control data are to be put into the later part of the resource block on which the first control data are to be transmitted;
scheduling payload data for the relay node into the later part of the resource block if second control data are not to be put into the later part of the resource block;
if the payload data are to be transmitted in the later part of the resource block, the first control data indicating the resource block on which the first control data are to be transmitted and the first control data further indicating at least another one of the resource blocks on which payload data for the relay node are to be transmitted; and
transmitting the data frame to the relay node.

2. The method according to claim 1, wherein the first control data comprises a downlink assignment and/or the second control data comprise an uplink grant.

3. The method according to claim 1, wherein the later parts are transmitted with a higher throughput than the early parts.

4. The method according to claim 1, wherein each of at least some of the first parts and the second parts have a flexible border.

5. The method according to claim 1, wherein payload data for nodes other than the relay node are not allowed to be transmitted on the resource block indicated by the first control data.

6. A control node for a wireless communication system comprising:
a controller for creating a data frame comprising a plurality of resource blocks, at least one of the plurality of resource blocks comprising an early part and a later part, wherein the early part of one of the resource blocks comprises first control data for controlling a relay node;
a checking entity for checking whether second control data are to be put into the later part of the resource block comprising the first control data;
a scheduler for scheduling payload data for the relay node into the later part if second control data are not to be put into the later part; and
a transmitter for transmitting the data frame to the relay node,
wherein the first control data indicates the resource block on which the first control data are to be transmitted and indicates at least another one of the resource blocks on which payload data for the relay node are to be transmitted if the payload data are to be transmitted in the later part.

7. The control node according to claim 6, wherein the transmitter is adapted to transmit the later parts with a higher throughput than the early parts.

8. The control node according to claim 6, wherein the control node is a eNodeB or a Pico-eNodeB.

9. A method for operating a relay node for a wireless communication system comprising the steps:
receiving a data frame from a control node, wherein the data frame comprises a plurality of resource blocks, at least one of the plurality of resource blocks comprising an early part and a later part, wherein the early part of one of the resource blocks comprises first control data for controlling the relay node;
checking whether the resource block on which the first control data are received and at least another one of the resource blocks on which payload data for the relay node are received are indicated by the first control data;
determining that the later part of the resource block contains payload data if the resource block is indicated; and
processing the later part according to the determination.

10. A relay node for a wireless communication system comprising:
a receiver for receiving a data frame from a control node, wherein the data frame comprises a plurality of resource blocks, at least one of the plurality of resource blocks comprising an early part and a later part, wherein the early part of one of the resource blocks comprises first control data for controlling the relay node;
a checking entity for checking whether the resource block on which the first control data are received and at least another one of the resource blocks on which payload data for the relay node are received are indicated by the first control data;
a decision entity for determining that the later part of the resource block contains payload data if the resource block is indicated; and
a processor for processing the later part according to the determination.

11. The relay node of claim 10, wherein the decision entity excludes an early part of the indicated resource block as a carrier of payload data when determining that the later part contains the payload data without an explicit instruction in the data frame to exclude the early part.

* * * * *